3,088,863
O,O-DIALKYL-S-HYDROXYPHENYLPROPYL PHOSPHORODITHIOATES

Sidney B. Richter, Chicago, Ill., assignor to Velsicol Chemical Corporation, Chicago, Ill., a corporation of Illinois
No Drawing. Filed July 12, 1961, Ser. No. 123,428
14 Claims. (Cl. 167—30)

This invention relates to new chemical compositions of matter. More specifically, this invention relates to new chemical compounds of the formula:

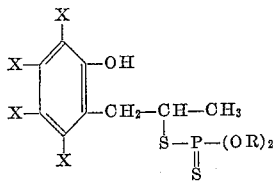

wherein X is independently selected from the group consisting of hydrogen, chlorine, and bromine atoms, unsubstituted lower alkyl, unsubstituted lower alkoxy, nitro, amino, and hydroxy radicals; and R is an unsubstituted alkyl radical containing from 1 to 3 carbon atoms. These new compounds, useful as pesticides, particularly as insecticides, are the 1:1 addition products of the dialkyl phosphorodithioates, $HSP(S)(OR)_2$, where R is as defined above, with a suitable o-allyl phenol.

The suitable o-allyl phenol reactants include o-allyl phenol, which is a preferred reactant due to its greater availability, as well as its halo-, lower-alkyl-, lower-alkoxy-, nitro-, amino-, and hydroxy ring-substituted derivatives. The substituted o-allylphenol reactants can be readily prepared, for example, by the Claisen rearrangement of an appropriately substituted allyloxy phenyl ether, as described by Tarbell in Organic Reactions, vol. II, edited by Adams et al., pp. 1–48 (1944).

Examples of the suitable ring-substituted ortho-allyl phenol reactants which can be prepared by the above method are:

2-allyl-6-methylphenol, 2-allyl-3-methylpenhol,
2-allyl-4-methylphenol, 2-allyl-4,6-dimethylphenol,
2-allyl-3,5-dimethylphenol, 2-allyl-6-ethylphenol,
2-allyl-3-ethylphenol, 2-allyl-4-ethylphenol,
2-allyl-6-n-propylphenol, 2-allyl-6-iso-propylphenol,
2-allyl-6-methoxyphenol, 2-allyl-5-methoxyphenol,
2-allyl-4-methoxyphenol, 2-allyl-6-chlorophenol,
2-allyl-4-chlorophenol, 2-allyl-5-chlorophenol,
2-allyl-4,6-dichlorophenol, 2-allyl-3,4,5-trichlorophenol,
2-allyl-3,4,5,6-tetrachlorophenol, 2-allyl-6-bromophenol,
2-allyl-4-bromophenol, 2-allyl-3,5-dibromophenol,
2-allyl-6-nitrophenol, 2-allyl-4-nitrophenol,
2-allyl-5,6-dinitrophenol, 2-allyl-3,6-dinitrophenol,
2-allyl-4-aminophenol, 2-allyl-6-hydroxyphenol,
2-allyl-5-hydroxyphenol, and the like. The suitable substituted o-allylphenol reactants also include o-allylphenols having more than one species of ring substituents. For example, the suitable o-allylphenol reactants also include: 2-allyl-4-methyl-6-methoxyphenol, 2-allyl-4-nitro-5-hydroxyphenol, 2-allyl-4-propyl-6-methoxyphenol, and the like.

The new compounds of this invention can be prepared readily by the addition of approximately equal molecular proportions of the dialkyl phosphorodithioate and o-allylphenol reactants employed. While these are satisfactory proportions of reactants, it is preferred to use a slight excess of the dialkyl phosphorodithioate. The reaction can be carried out satisfactorily in the absence of a solvent, but relatively inert solvents or diluents, such as benzene, toluene, or xylene, can be used if desired. It is also desirable to add a small amount of an oxidation inhibitor such as hydroquinone to the reaction mixture. The reactions temperature is not critical, but reaction temperatures in the range from about 60° C. to about 100° C. (or the reflux temperature of the solvent or diluent, if one is used) are preferred. While the exact reaction time is dependent on a variety of factors, the addition reactions are generally complete within 30 hours.

When the reaction is completed, the reaction mixture is cooled and taken up in a suitable solvent, if one has not already been used in the reaction. The solution is then washed, first with a dilute aqueous solution of a base, such as sodium carbonate, to remove any excess acid reactant, and then with water. The solution is dried over an anhydrous drying agent, such as sodium sulfate, and filtered. The solvent is then distilled off in vacuo to leave a residue of the desired addition product, which is often sufficiently pure for pesticidal use without further purification. If desired, however, it can be purified by fractional distillation, crystallization from a suitable solvent or other techniques known to those skilled in the art.

The manner in which the new compounds of this invention can be prepared is illustrated in the following examples. It is understood that although a specific o-allylphenol reactant is specified in the examples for the purpose of illustration, other o-allylphenol reactants within the scope of this invention, examples of which have been above specified, can be substituted therefor.

EXAMPLE 1

*Preparation of 2-[2-(O,O-Dimethylphosphorodithio)-Propyl]Phenol* o-Allylphenol (26.8 g.; 0.2 mol.), O,O-dimethylphosphorodithioate (40 g.; 0.25 mol.), and hydroquinone (0.1 g.) were placed into a 100 ml. round-bottom flask fitted with a reflux condenser, mechanical stirrer, and internal thermometer. The reaction solution was heated and maintained at 65° C. for approximately 24 hours. The solution was cooled, diluted with benzene, washed first with 10% aqueous sodium carbonate solution, then with water, dried over anhydrous sodium sulfate, and filtered. The benzene was distilled off in vacuo, and the residue heated to 150° C. under reduced pressure to remove any unreacted o-allylphenol. The residue therefrom was impure 2-[2-(O,O-dimethylphosphorodithio)-propyl]phenol, having the following elemental analysis as calculated for $C_{11}H_{17}O_3S_2P$:

|  | C | H | P |
|---|---|---|---|
| Theoretical, percent | 45.21 | 5.82 | 10.61 |
| Found, percent | 46.45 | 6.20 | 10.80 |

2-[2-(O,O-dimethylphosphorodithio)propyl]phenol, prepared as above, is sufficiently pure for the common pesticidal applications as herein described, although the product may be purified, if desired, as heretofore described.

EXAMPLE 2

*Preparation of 2-[2-(O,O-Diethylphosphorodithio)-Propyl]-6-Methylphenol*

2-allyl-6-methylphenol (29.6; 0.2 mol.), O,O-diethylphosphorodithioate (42.5 g.; 0.25 mol.), and hydroquinone (0.1 g.) are placed into a 100 ml. round-bottom flask fitted with a reflux condenser, mechanical stirrer, and internal thermometer. The solution is heated and maintained at 70° C. for about 22 hours. Upon cooling, the solution is diluted with benzene, washed with 10% aqueous sodium carbonate solution, washed with water, dried over anhydrous sodium sulfate, and filtered.

The benzene is removed in vacuo, and the residue distilled in vacuo to recover any unreacted 2-allyl-6-methylphenol. The residue therefrom is crude 2-[2-(O,O-diethylphosphorodithio)propyl]-6-methylphenol, which can be used as such, or can be purified, if desired, by any of the methods heretofore described.

EXAMPLE 3

*Preparation of 2-[2-(O,O-Dimethylphosphorodithio)-Propyl]-4-Chlorophenol*

2-allyl-4-chlorophenol (33.7 g., 0.2 mol.), O,O-dimethylphosphorodithioate (40 g.; 0.25 mol.), and hydroquinone (0.1 g.) are mixed and heated at 70° C. for about 20 hours. Upon cooling, the solution is diluted with benzene, washed with 10% aqueous sodium carbonate solution, washed with water, dried over anhydrous sodium sulfate, and filtered. The benzene is removed in vacuo, and the residue distilled in vacuo, to yield 2-[2-(O,O-dimethylphosphorodithio)propyl]-4-chlorophenol.

Other useful compounds within the scope of this invention can be prepared in the manner detailed in the previous examples. Given in the following examples are the reactants required to prepare the indicated named compounds of this invention:

EXAMPLE 4

2 - allyl - 3 - ethylphenol+O,O - di - n - propylphosphorodithioate=2 - [2 - (O,O - di - n - propylphosphorodithio)propyl]-3-ethylphenol.

EXAMPLE 5

2 - allyl - 6 - n - propylphenol+O,O - dimethylphosphorothioate=2 - [2 - (O,O - dimethylphosphorodithio)propyl]-6-n-propylphenol.

EXAMPLE 6

2 - allyl - 5,6 - dichlorophenol+O,O - dimethylphosphorodithioate=2 - [2 - (O,O - dimethylphosphorodithio)propyl]-5,6-dichlorophenol.

EXAMPLE 7

2 - allyl - 3,5 - dichlorophenol+O,O - dimethylphosphorodithioate=2 - [2 - (O,O - dimethylphosphorodithio)propyl]-3,5-dichlorophenol.

EXAMPLE 8

2 - allyl - 4,5,6 - trichlorophenol+O,O - dimethylphosphorodithioate=2 - [2 - (O,O - dimethylphosphorodithio)propyl]-4,5,6-trichlorophenol.

EXAMPLE 9

2 - allyl - 3,4,6 - trichlorophenol+O,O - dimethylphosphorodithioate=2 - [2 - (O,O - dimethylphosphorodithio)propyl]-3,4,6-trichlorophenol.

EXAMPLE 10

2 - allyl - 3,4,5 - trichlorophenol+O,O - dimethylphosphorodithioate=2 - [2 - (O,O - dimethylphosphorodithio)propyl]-3,4,5-trichlorophenol.

EXAMPLE 11

2 - allyl - 3,4,5,6 - tetrachlorophenol+O,O - dimethylphosphorodithioate=2 - [2 - (O,O - dimethylphosphorodithio)propyl]-3,4,5,6-tetrachlorophenol.

EXAMPLE 12

2 - allyl - 6 - bromophenol+O,O-diethylphosphorodithioate= 2 -[2-(O,O-diethylphosphorodithio)propyl]-6-bromophenol.

EXAMPLE 13

2 - allyl - 6 - methoxyphenol+O,O-dimethylphosphorodithioate= 2- [2-(O,O-dimethylphosphorodithio)propyl]-4-methoxyphenol.

EXAMPLE 14

2 - allyl-6-nitrophenol+O,O-dimethylphosphorodithioate = 2 - [2-(O,O-dimethylphosphorodithio)propyl]-6-nitrophenol.

EXAMPLE 15

2 - allyl - 4,6-dinitrophenol+O,O-dimethylphosphorodithioate = 2 - [2-(O,O-dimethylphosphorodithio)propyl]-4,6-dinitrophenol.

EXAMPLE 16

2 - allyl - 6-aminophenol+O,O-dimethylphosphorodithioate = 2 - [2-(O,O-dimethylphosphorodithio)propyl]-6-aminophenol.

EXAMPLE 17

2 allyl - 5-hydroxyphenol+O,O-dimethylphosphorodithioate=2 - [2 - (O,O-dimethylphosphorodithio)propyl]-5-hydroxyphenol.

EXAMPLE 18

2 - allyl - 4-methyl-6-methoxyphenol+O,O-dimethylphosphorodithioate=2 - [2-(O,O-dimethylphosphorodithio)propyl]-4-methyl-6-methoxyphenol.

EXAMPLE 19

2 - allyl - 4-nitro-5-hydroxyphenol+O,O-dimethylphosphorodithioate=2 - [2-(O,O-dimethylphosphorodithio)propyl]-4-nitro-5-hydroxyphenol.

The utility of the compounds of this invention was illustrated, for example, by experiments carried out for the control of insects by feeding. The test compounds were formulated as 10% wettable powder concentrates by adding to an inert carrier and grinding to a uniform blend on a ball mill. The respective formulations were diluted with water to the desired concentrations of actual chemical. Cranberry bean plants were dipped in appropriate concentrations of the various formulations and allowed to dry. Third instar stage larvae of the insects were then caged on the treated plants and maintained under greenhouse conditions for 48 hours, after which time observations of mortality were made. Three replicates were used for each level of application. In these experiments, the product of Example 1 gave the following results:

| Concentration, Percent Actual Chem. | Insect | Percent Mortality |
|---|---|---|
| 0.4 | Mexican Bean Beetle | 100.0 |
| 0.2 | do | 100.0 |
| 0.1 | do | 90.0 |

The utility of the compounds of this invention was also illustrated by experiments carried out for the control of two-spotted spider mites by contact. The test compounds were formulated into 10% wettable powder concentrates by adding to an inert carrier and grinding to a uniform blend on a ball mill. The respective formulations were dispersed in water to a concentration of 0.4 percent actual chemical, and applied by dipping Cranberry bean plants infested with adult two-spotted spider mites into the dispersed formulation. The plants were maintained under greenhouse conditions for 72 hours, after which time observations of mortality were made. In these experiments, the product of Example 1 gave the following results:

| Concentration, Percent Actual Chem. | Organism | Percent Mortality |
|---|---|---|
| 0.4 | Two-spotted spider mites | 91.0 |

The utility of the compounds of this invention was further illustrated by experiments carried out for the systemic control of mites and aphids by root absorption and translocation. The test compounds were dissolved in acetone and dispersed in distilled water at the desired concentrations of actual chemical. Host plants, infested with the pests were uprooted, washed free of soil, and placed in glass jars containing 100 p.p.m. of the dispersed test compound. Aluminum foil was placed around the plant stem and jar to reduce possible escape of toxic vapors from the test dispersion. The test plants were maintained in this manner in the greenhouse for the indicated period and then observed for systemic pesticidal effectiveness. Three replicates were used for each treatment. In these experiments, the product of Example I gave the following results:

| Concentration, p.p.m. | Organism | Life Stage | Percent Mortality |
|---|---|---|---|
| 100 | Two-spotted spider mites | mixed | 87.5 after 7 days. |
| 100 | Pea aphids | adult | 79.3 after 72 hours. |

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. Other pesticides as well as such substances as fertilizers, activators, adhesives, spreaders, and synergists can be added to these formulations if desired.

The active compounds of this invention are applied in amounts sufficient to exert the desired pesticidal action. The amount of the active compound present in the pesticidal compositions as actually applied for preventing or controlling pest infestations varies with the type of application, the particular species which are to be controlled, the purpose for which the treatment is made, and the like. Generally, the solid or liquid compositions of this invention will contain up to about 90% of the active compounds.

I claim:
1. 2 - [2 - (O,O-dipropylphosphorodithio)propyl] - 4-chlorophenol.
2. 2 - [2 - (O,O-dimethylphosphorodithio)propyl]-5,6-dichlorophenol.
3. 2 - [2 - (O,O-dimethylphosphorodithio)propyl]-3,5-dichlorophenol.
4. 2 - [2 - (O,O-dipropylphosphorodithio)propyl]-3,4,5-trichlorophenol.
5. 2 - [2 - (O,O-dimethylphosphorodithio)propyl]-4,5,6-trichlorophenol.
6. 2 - [2 - (O,O-dimethylphosphorodithio)propyl]-3,4,6-trichlorophenol.
7. 2 - [2 - (O,O-dimethylphosphorodithio)propyl]-3,4,5,6-tetrachlorophenol.
8. 2 - [2 - (O,O - dimethylphosphorodithio)propyl]-6-nitrophenol.
9. 2 - [2 - (O,O-dimethylphosphorodithio)propyl]-4,6-dinitrophenol.
10. 2 - [2 - (O,O-dimethylphosphorodithio)propyl]-6-aminophenol.
11. 2 - [2 - (O,O-dimethylphosphorodithio)propyl]-6-bromophenol.
12. 2 - [2 - (O,O - dimethylphosphorodithio)propyl]-6-methoxyphenol.
13. 2 - [2 - (O,O - dimethylphosphorodithio)propyl]-6-hydroxyphenol.
14. A method of destroying undesirable mites which comprises contacting these mites with a miticidal composition comprising an inert carrier and as the essential active ingredient, in a quantity which is toxic to said mites, a compound of the formula

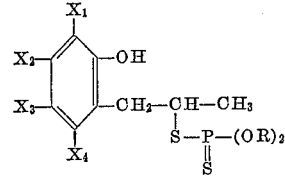

wherein $X_1$, $X_2$, $X_3$ and $X_4$ are independently selected from the groups consisting of hydrogen, chlorine and bromine atoms, unsubstituted lower alkyl, unsubstituted lower alkoxy, nitro, amino, and hydroxy radicals; and R is an unsubstituted alkyl radical containing from 1 to 3 carbon atoms; provided that at least one of $X_1$, $X_2$, $X_3$ and $X_4$ is selected from the group consisting of chlorine and bromine atoms, and unsubstituted lower alkoxy, nitro, amino and hydroxy radicals.

References Cited in the file of this patent
UNITED STATES PATENTS

| 2,530,339 | Mikeska et al. | Nov. 14, 1950 |
| 2,589,675 | Cook et al. | Mar. 18, 1952 |
| 2,909,557 | Schrader | Oct. 20, 1959 |
| 2,910,501 | Dorken et al. | Oct. 27, 1959 |
| 3,017,422 | Thompson | Jan. 16, 1962 |